(12) United States Patent
Wang et al.

(10) Patent No.: US 10,098,356 B2
(45) Date of Patent: Oct. 16, 2018

(54) HOUSEHOLD NOODLE MAKER

(71) Applicant: JOYOUNG COMPANY LIMITED, Shandong (CN)

(72) Inventors: Xuning Wang, Shandong (CN); Rongqing Su, Shandong (CN); Jian Liu, Shandong (CN); Menglin Lu, Shandong (CN)

(73) Assignee: JOYOUNG COMPANY LIMITED, Shandong (CN)

(*) Notice: Subject to any disclaimer, the term of this patent is extended or adjusted under 35 U.S.C. 154(b) by 0 days.

(21) Appl. No.: 15/514,150

(22) PCT Filed: Sep. 28, 2015

(86) PCT No.: PCT/CN2015/090865
§ 371 (c)(1),
(2) Date: Mar. 24, 2017

(87) PCT Pub. No.: WO2016/045634
PCT Pub. Date: Mar. 31, 2016

(65) Prior Publication Data
US 2017/0295803 A1    Oct. 19, 2017

(30) Foreign Application Priority Data

Sep. 28, 2014 (CN) ............................ 2014 1 0507982
Sep. 28, 2014 (CN) ............................ 2014 1 0508014
Sep. 28, 2014 (CN) ............................ 2014 1 0508187

(51) Int. Cl.
*A21C 11/16* (2006.01)
*A21C 11/20* (2006.01)
(Continued)

(52) U.S. Cl.
CPC ................ *A21C 11/24* (2013.01); *A21C 1/02* (2013.01); *A21C 3/02* (2013.01); *A21C 3/04* (2013.01);
(Continued)

(58) Field of Classification Search
CPC ........... A21C 3/04; A21C 11/16; A21C 11/20; B29C 47/0004; B29C 47/1018;
(Continued)

(56) References Cited

U.S. PATENT DOCUMENTS 4,219,318 A    8/1980  Cavalli
4,367,064 A *  1/1983  Prandelli .................. A21C 1/02
                                                    366/77
(Continued)

FOREIGN PATENT DOCUMENTS

CN        2160204 Y    4/1994
CN        2200297 Y    6/1995
(Continued)

OTHER PUBLICATIONS

ISR cited in PCT/CN2015/090865 dated Dec. 11, 2015.
(Continued)

*Primary Examiner* — Yogendra N Gupta
*Assistant Examiner* — Joseph S Leyson
(74) *Attorney, Agent, or Firm* — Workman Nydegger

(57) ABSTRACT

A vertical household noodle maker includes a base, a stirring container connected to the base, a stirring rod longitudinally arranged in the stirring container, an extrusion cylinder horizontally arranged at one side below the stirring container, a spiral rod arranged in the extrusion cylinder, an extrusion die and a control unit. The stirring rod includes a rod body and a stirring blade. The motor rotates the stirring rod and the spiral rod, and a feeding inlet in communication with the extrusion cylinder is provided at a bottom of the
(Continued)

stirring container. An inner wall of the stirring container is provided with a cutting rod, and a projection of the cutting rod at least partially overlaps with a projection of the stirring blade in the horizontal direction when the stirring blade is driven by the motor to rotate to a position of the cutting rod.

1 Claim, 5 Drawing Sheets

(51) Int. Cl.
*A21C 11/24* (2006.01)
*A21C 1/02* (2006.01)
*A21C 3/02* (2006.01)
*A21C 3/04* (2006.01)
*A21C 11/22* (2006.01)
*A21C 3/00* (2006.01)
*A21C 11/00* (2006.01)
*B29C 47/10* (2006.01)
*B29C 47/36* (2006.01)
*B29C 47/38* (2006.01)
*B29C 47/58* (2006.01)
*B29C 47/66* (2006.01)

(52) U.S. Cl.
CPC .............. *A21C 11/16* (2013.01); *A21C 11/20* (2013.01); *A21C 11/22* (2013.01); *A21C 3/00* (2013.01); *A21C 11/00* (2013.01); *B29C 47/1018* (2013.01); *B29C 47/362* (2013.01); *B29C 47/365* (2013.01); *B29C 47/385* (2013.01); *B29C 47/585* (2013.01); *B29C 47/667* (2013.01)

(58) Field of Classification Search
CPC ... B29C 47/362; B29C 47/365; B29C 47/385; B29C 47/585; B29C 47/667
See application file for complete search history.

(56) References Cited

U.S. PATENT DOCUMENTS

| | | | |
|---|---|---|---|
| 5,324,185 A | 6/1994 | Backus et al. | |
| 5,401,159 A | 3/1995 | Hsu | |
| 5,486,100 A | 1/1996 | Hsu | |

FOREIGN PATENT DOCUMENTS

| | | |
|---|---|---|
| CN | 2275899 Y | 3/1998 |
| CN | 2314595 Y | 4/1999 |
| CN | 2576005 Y | 10/2003 |
| CN | 101151974 A | 4/2008 |
| CN | 202476367 U | 10/2012 |
| CN | 102763696 A | 11/2012 |
| CN | 103518792 A | 1/2014 |
| CN | 203457748 U | 3/2014 |
| CN | 203492673 U | 3/2014 |
| CN | 203492675 | 3/2014 |
| CN | 203608767 U | 5/2014 |
| CN | 203608768 U | 5/2014 |
| CN | 203723334 U | 7/2014 |
| CN | 203723336 U | 7/2014 |
| CN | 203790862 U | 8/2014 |
| CN | 204090883 U | 1/2015 |
| CN | 204090884 U | 1/2015 |
| CN | 204090885 U | 1/2015 |
| CN | 204206989 U | 3/2015 |
| CN | 104542787 A | 4/2015 |
| CN | 104542788 A | 4/2015 |
| CN | 104542789 A | 4/2015 |
| GB | 1130721 | 10/1968 |
| GB | 2315228 B | 1/1998 |
| JP | S258348 | 10/1950 |
| JP | H0229919 | 8/1990 |
| JP | 2004313165 | 11/2004 |
| JP | 3205421 | 7/2016 |
| KR | 20030004000 A | 1/2003 |
| KR | 20050038606 | 4/2005 |

OTHER PUBLICATIONS

First Chinese Office Action cited in CN201410507982.3 dated Feb. 1, 2016.
First Chinese Office Action cited in CN201410508014.4 dated Feb. 2, 2016.
First Chinese Office Action cited in CN201410508187.6 dated Mar. 1, 2016.
Japanese Office Action cited in JP 2017-516517 dated Sep. 22, 2017.

* cited by examiner

HOUSEHOLD NOODLE MAKER

This application is the national phase of International Application No. PCT/CN2015/090865, titled "HOUSEHOLD NOODLE MAKER", filed on Sep. 28, 2015, which claims the priorities to Chinese Patent Application No. 201410508187.6 titled "EFFICIENT NOODLE MAKING METHOD OF HOUSEHOLD NOODLE MAKER", filed with the Chinese State Intellectual Property Office on Sep. 28, 2014, Chinese Patent Application No. 201410508014.4 titled "VERTICAL HOUSEHOLD NOODLE MAKER", filed with the Chinese State Intellectual Property Office on Sep. 28, 2014, and Chinese Patent Application No. 201410507982.3 titled "VERTICAL HOUSEHOLD NOODLE MAKER LEAVING NO RESIDUE", filed with the Chinese State Intellectual Property Office on Sep. 28, 2014, the entire disclosures of which are incorporated herein by reference.

FIELD

The present application relates to the field of food processors, and particularly to a household noodle maker having a good dough kneading effect.

BACKGROUND

With the improvement of living standards, food processors are more and more popular with consumers. Noodle makers, as one kind of them, are also more and more favored by consumers.

Conventional noodle makers generally include a horizontal noodle maker and a vertical noodle maker, and they both include a base, a stirring assembly and an extrusion assembly. The stirring assembly includes a stirring container and a stirring rod. The extrusion assembly includes a spiral rod, an extrusion cylinder, and an extrusion die.

A horizontal noodle maker is disclosed in Patent No. CN103518792A. Since a stirring rod and a spiral rod are rotated coaxially and the radius of rotation of the stirring rod is greater than the radius of rotation of the spiral rod, the stirring rod rotates forwardly to mix and stir flour and water into dough pieces or doughs in a case that a dough kneading process is performed; in a case that a dough extruding process is performed, the stirring rod rotates reversely, meanwhile the mixed dough pieces or doughs are scraped off by a front end of the stirring blade, and are finally fall into an extrusion cylinder via a feeding inlet located above the extrusion cylinder, and are then extruded out by the spiral rod. However, a problem is presented in this method, at an earlier stage of the dough extruding process, since there are many dough pieces or doughs, it is easy for the stirring blade to scrape and bring the dough pieces or doughs into the extrusion cylinder, however, at a later stage of the dough extruding process, the dough pieces or doughs become less, and cannot be scraped off by the stirring blade, or, the dough pieces or doughs may still fall into the stirring container again just after being scraped to the feeding inlet, causing part of dough pieces or doughs being remained in the stirring container.

Further, a vertical noodle maker is disclosed in Patent No. CN202476367U. Since a stirring rod and a spiral rod are not rotated coaxially, and an extrusion cylinder is located below the stirring container, the problem of dough remaining is well addressed. However, the conventional vertical noodle makers still have some issues. When a dough kneading process is performed, the stirring rod mixes and stirs flour and water into dough pieces or doughs; and when a dough extruding process is performed, it is difficult for the dough pieces or doughs to enter the extrusion cylinder via the feeding inlet since the dough pieces or doughs mixed have large sizes, thus decreasing the dough extruding efficiency, and further decreasing the processing efficiency.

SUMMARY

A vertical household noodle maker is provided according to the present application, which has a better dough kneading effect, can make chewy noodles, allow easily feeding of doughs and leave no residue. A household noodle maker includes: a base having a motor, a stirring container connected to the base, a stirring rod, an extrusion cylinder, a spiral rod, an extrusion die and a control unit. The stirring rod is longitudinally arranged in the stirring container, and the stirring rod includes a rod body and a stirring blade arranged on the rod body. The extrusion cylinder is horizontally arranged at one side below the stirring container, the spiral rod is arranged in the extrusion cylinder. The motor is configured to rotate the stirring rod and the spiral rod, and a feeding inlet is provided at a bottom of the stirring container, and the feeding inlet is in communication with the extrusion cylinder. An inner wall of the stirring container is provided with a cutting rod, and a projection of the cutting rod in a horizontal direction at least partially overlaps with a projection of the stirring blade in the horizontal direction in a case that the stirring blade is driven by the motor to rotate to a position of the cutting rod.

The stirring container may be in a cylindrical shape, and the stirring container has a diameter of D, and a length of an overlapping portion between the cutting rod and the stirring blade is L, where, $D/5 \leq L < D/2$.

The stirring blade includes an upper stirring blade and a lower stirring blade, and the cutting rod is located between the upper stirring blade and the lower stirring blade.

The cutting rod has a length of L1, and the number of the upper stirring blade and the number of the lower stirring blade are both one and the upper stirring blade and the lower stirring blade are symmetrically distributed with respect to the rod body, and the upper stirring blade has a length of L2, $D/10 \leq L1 < L2 < D/2$, and the lower stirring blade has a length of L3, and $D/10 \leq L1 < L3 < D/2$.

The cutting rod may be arranged above the feeding inlet, and may be located at an upstream side of the feeding inlet.

The cutting rod may be in a long strip shape and be platy, and protrudes inwardly into the stirring container in a horizontal direction; or the cutting rod may be in an arc shape and be platy, and protrudes inwardly into the stirring container in a horizontal direction.

The extrusion cylinder may include a material pushing chamber and an extrusion chamber. The material pushing chamber extends upwards to intersect with the bottom of the stirring container to form the feeding inlet, the feeding inlet extends horizontally towards the extrusion cylinder along the bottom of the stirring container, and extends to a side wall of the stirring container. A pushing spiral of the spiral rod may be arranged in the material pushing chamber below the feeding inlet, and rotation directions of the spiral rod are opposite during a stirring stage and a kneading stage.

A ratio of an area of the feeding inlet to an area of the bottom of the stirring container is S, where $1/8 \leq S < 1/2$. A place, where the feeding inlet is connected to the side wall of the stirring container, may be provided with an oblique surface, and the oblique surface inclines towards an inside of the extrusion cylinder and extends downwards into the material pushing chamber.

A height difference between an uppermost end of the pushing spiral of the spiral rod and the bottom of the stirring container is h1, where h1≤10 mm.

In the present application, the "stirring rod rotates forwardly" refers to rotating in a counterclockwise direction, and, "the stirring rod rotates reversely" refers to rotating in a clockwise direction, the "counterclockwise" or the "clockwise" are both directions viewed from a motor shaft extension end. The "spiral rod rotates reversely" refers to a rotation for pushing the material towards the extrusion die along the spiral, reversely, "the spiral rod rotates forwardly" refers to a rotation for pushing the material away from the extrusion die along the spiral. The "upstream" refers to a side of the feeding inlet which the stirring rod passes through first at the dough extruding stage. The orientation or positional relationship denoted by the terms "upper", "lower", "left", "right", "front", "rear" are all defined based on the orientation or positional relationships shown in the drawings, and are simply for facilitating the description of the present application and simplifying the description, which does not denote or imply that the device or the member referred to must have a particular orientation or location, or must be configured or operated in a particular orientation or location, therefore, these terms cannot be understood as limitations to the present application.

The present application have the following beneficial effects.

First, by providing the cutting rod on the inner wall of the stirring rod, at the dough kneading stage, the cutting rod cooperates with the stirring blade to continuously stir and mix the flour and water into doughs, and cut off part of the doughs or tear them to be deformed into doughs smaller than the feeding inlet in size, and then mix these doughs together, and then cut again part of the doughs mixed together or tear them to be deformed into doughs smaller than the feeding inlet in size, cycled as such, the flour and water are mixed sufficiently and uniformly to a required mixing state. Further, the dough kneading is speeded up, and the dough kneading efficiency is improved, and the noodles thus made may be more chewy. At the dough extruding stage, the cutting rod cooperates with the stirring blade to further tear or knead the doughs, and then the doughs are mixed and torn again, thus allowing the doughs to be kneaded more sufficiently, and the noodles to be made to be more chewy, moreover, the doughs mixed are cut or torn to be deformed into doughs smaller than the feeding inlet in size, and are easier to enter from the feeding inlet, thus the dough feeding is allowed to be easier, and no dough residue will be left.

Secondly, by configuring the stirring container into a cylindrical shape, the inner wall of the stirring container is smooth, and no dough kneading dead corner will be formed inside the inner wall of the stirring container when the dough kneading process is performed, thus avoiding a waste of leaving dough residue in the stirring container. Secondly, a length of an overlapping portion between the cutting rod and the stirring blade is L, where $D/5 \leq L < D/2$, thus allowing the cutting rod to have a certain overlapping length with the stirring blade, which ensures that the cutting rod and the stirring blade can perform better cutting, and effectively ensures that the flour and the water can be mixed more sufficiently and uniformly. Moreover, the doughs are more easily cut off or torn to be deformed, and the dough feeding is facilitated. In the case that L is smaller than D/5, the cutting rod cannot perform effective cutting together with the stirring blade, that is, the generated cutting force is too small, causing a poor dough kneading effect. In the case that L is greater than D/2, the cutting force between the cutting rod and the stirring blade is too large, causing an increased load and a reduced service life of the motor. If the service life is maintained, the performance of the motor is required to be improved, causing an increased cost.

Thirdly, the cutting rod is located between the upper stirring blade and the lower stirring blade, such that in one revolution of the stirring rod, cutting are performed twice, thus the working efficiency of the cutting rod is improved, and further the efficiencies of the dough kneading stage and the dough extruding stage are improved. Further, the cutting rod and the upper stirring blade and/or the lower stirring blade are arranged to allow the projection of the cutting rod in the horizontal direction to at least partially overlap with the projection of the upper stirring blade and/or the lower stirring blade in the horizontal direction. Thus, in the dough kneading stage, the overlapping planes of the cutting rod and the upper stirring blade and/or the overlapping planes of the cutting rod and the lower stirring blade respectively define a cutting region therebetween, thus ensuring the effect and efficiency of cutting the doughs. By the cutting and the repeated kneading after the cutting, the manual repeated dough kneading effect is achieved, such that the noodles made of the dough is more chewy. In the kneading stage, the cutting force between the cutting rod and the stirring rod is greater, such that the doughs can be cut smaller, and can more easily enter into the feeding inlet, thus the dough feeding process can be more easy, and no dough residue will be left.

Fourthly, one upper stirring blade and one lower stirring blade are provided and are symmetrically distributed with respect to the rod body, which facilitates the manufacture and machining of the stirring rod, and the simplifying of the structure of the stirring rod, and also facilitates the doughs' falling down and participating into next mixing and stirring, and further facilitates cleaning of the stirring rod, and the upper stirring blade and the lower stirring blade are symmetrically distributed with respect to the rod body, which ensures a smooth operation of the stirring rod, and reduces the noise during the operation of the stirring rod. Further, the stirring container has a diameter of D, and the cutting rod has a length of L1, and the upper stirring blade has a length of L2, and $D/10 \leq L1 < L2 < D/2$, the lower stirring blade has a length of L3, and $D/10 \leq L1 < L3 < D/2$. The advantages of such an arrangement lie in that in this way, the upper stirring blade and the lower stirring blade can overlap with the cutting rod effectively so as to generate large cutting forces, which ensures that, when the stirring rod rotates, a large amount of flour can be driven to move and allow the flour to roll violently, thus the sufficient and uniform mixing is achieved, and the dough kneading effect is improved, and sufficient cutting forces is further ensured, which allows the doughs to easily enter the feeding inlet. Moreover, L2 or L3 being greater than L1 also allows the cutting rod to effectively overlap with the upper stirring blade and the lower stirring blade, and ensures sufficient cutting forces, and further, ensures the strength of the cutting rod. In a case that L1 is smaller than D/10, the cutting rod cannot perform effective cutting together with the upper stirring blade and the lower stirring blade, that is, the cutting forces are too small, causing a poor dough kneading effect, and the doughs entering the feeding inlet may further be affected. In a case that L2 or L3 is greater than D/2, the upper stirring blade and the lower stirring blade may interfere with the inner wall of the stirring container. In a case that L1 is less than L2, the cutting rod is too long and apt to be broken, and has a poor strength, however, the upper stirring blade and the lower stirring blade are too short, causing a poor dough kneading effect.

Fifthly, the cutting rod is arranged at an upstream side of the feeding inlet, and is located above the feeding inlet. Since the cutting rod is located at the upstream side of the feeding inlet, in the kneading stage, after the cutting rod interacts with the upper stirring blade as well as the lower stirring blade to cut the materials, the materials fall into the feeding inlet directly, and further enter the extrusion cylinder, thus the dough feeding speed is speeded up, and the dough extruding efficiency is improved. While in the stirring stage, the stirring rod rotates reversely, the cutting rod is thus located at a downstream side of the feeding inlet, after the cutting rod interacts with the upper stirring blade as well as the lower stirring blade to cut the material, the material will not directly fall into the feeding inlet, and may continue to be rotated along with the upper stirring blade and the lower stirring blade, which prevents part of the materials that have not been fully mixed, for example, dry flour, from entering the extrusion cylinder during the stirring process, and prevents the noodles extruded out initially from carrying dry flour, having lots of burrs, being not chewy, and having poor mouth feel.

Sixthly, the cutting rod extends into the stirring container in a horizontal direction, which, in one aspect, ensures that the stirring and mixing process can be performed during the dough kneading process, and in another aspect, ensures that the stirring rod and the cutting rod can cooperate to cut doughs during kneading stage so as to sufficiently mix the doughs and allow the noodle to be made more chewy, and moreover, ensures that the doughs can be cut sufficiently small to continuously enter the feeding inlet, and be sufficiently extruded and shaped without any dough residue being left. Furthermore, the cutting rod and the stirring container are integrally formed, thus the secondary forming process is omitted, and the process efficiency is high, and the cutting rod has a high strength, and is not apt to be broken.

Seventhly, by arranging the feeding inlet at the bottom of the stirring container at the place away from the center of the stirring container, the stirred dough is moved towards the periphery of the stirring container under the action of the centrifugal force, and falls directly into the feeding inlet due to gravity, thus the dough feeding is facilitated, and the sufficient dough feeding is ensured, and the doughs are not apt to be left in the stirring container. By extending the feeding inlet to the side wall of the stirring container, the feeding inlet is ensured to be maximized, which allows more doughs to be fed per unit time, thus the efficiency of the dough feeding is improved. Since the pushing spiral is arranged below the feeding inlet, in the dough feeding process, the doughs can directly fall into the pushing spiral, and under the action of the pushing spiral, the doughs entered the pushing spiral can be ensured to be directly brought into the extrusion chamber, thus the smoothness of the dough feeding is ensured. Rotation direction of the spiral rod are opposite at the stirring stage and the dough extruding stage, thus the pushing spiral is allowed to participate in the stirring process of the flour, and the flour will be brought out by the pushing spiral and return to the stirring container to participate in the stirring process without being accumulated in the extrusion chamber, therefore locking of the motor due to accumulation of flour may not be caused, while in the dough extruding stage, the flour can normally participate in the extruding process of the doughs.

Finally, by providing the oblique surface, the stirred doughs, after entering the feeding inlet, enter the pushing spiral in the material pushing chamber under the downward sliding effect of the oblique surface to participate in the pushing and extruding process, and under the action of gravity, the doughs is guided towards the extrusion cylinder to enter the extrusion cylinder more smoothly, which not only improves the efficiency in shaping the noodles, but also avoids dead corner being formed in the material pushing chamber, thus the dough residual rate is low, which avoids waste caused by the dough residue, and also facilitates the cleaning.

DETAILED DESCRIPTION

Figure 1:
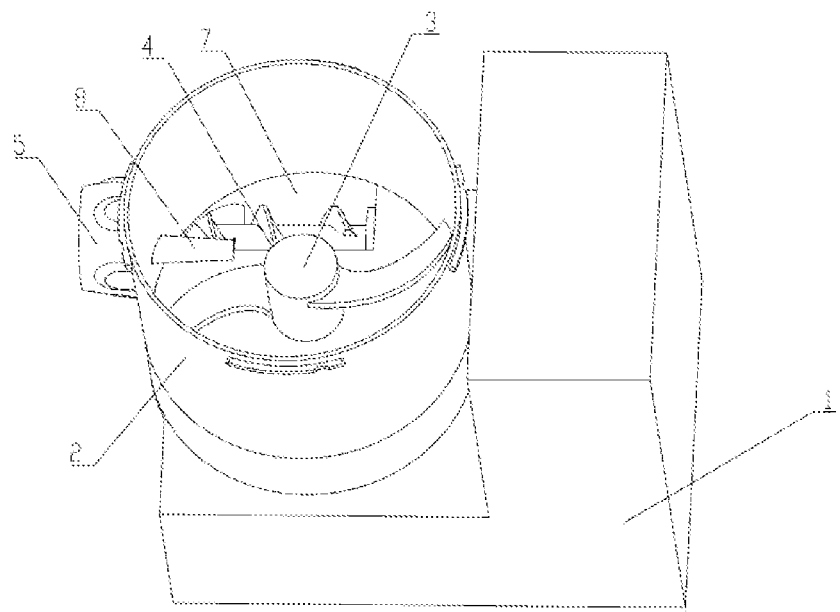
FIG. 1 is a schematic view showing the structure of a noodle maker according to a first embodiment of the present application.
Figure 2:
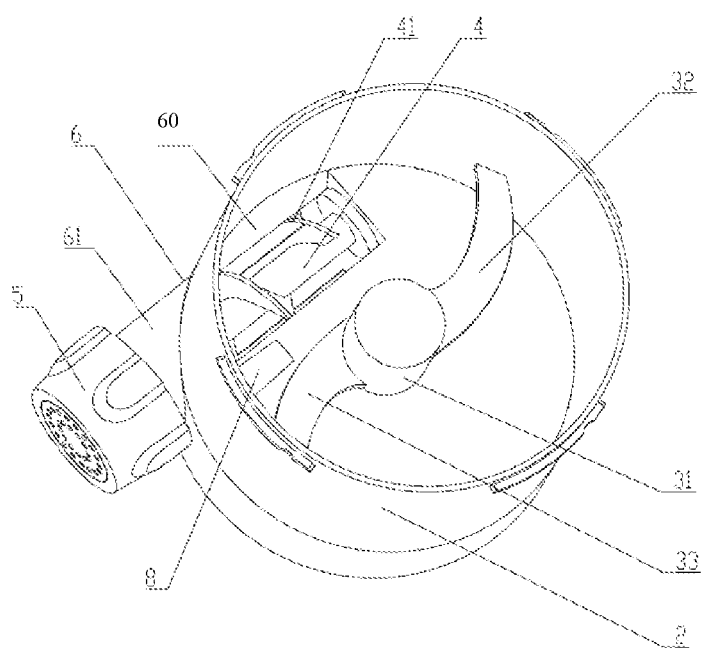
FIG. 2 is a schematic view showing a stirring container and a stirring rod in cooperation with each other in the noodle maker according to the first embodiment of the present application.

The present application is further described in detail hereinafter with reference to drawings and embodiments.

As shown in FIGS. 1 to 4, a vertical noodle maker according to a first embodiment of the present application includes a base 1, a stirring container 2 connected to the base 1, a stirring rod 3, an extrusion cylinder 6, a spiral rod 4, and an extrusion die 5. A motor (not illustrated) and a control unit (not illustrated) electrically connected to the motor are provided in the base 1, and the control unit includes a control circuit module and a circuit detection module.

Figure 3:
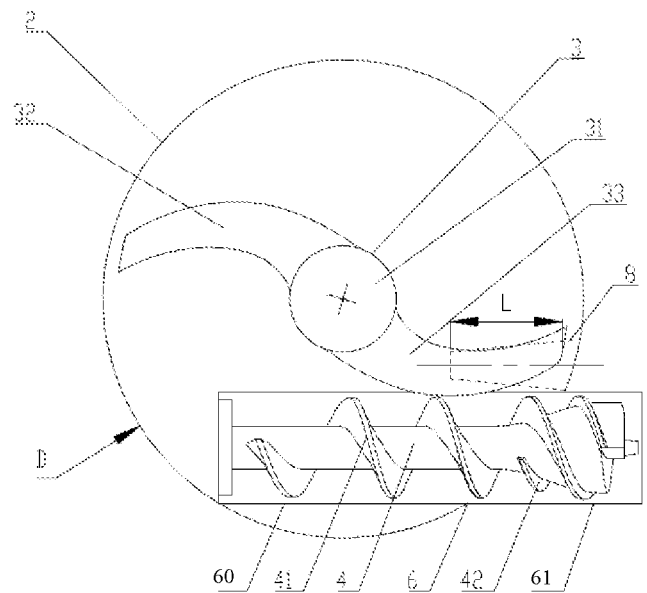
FIG. 3 is a top view showing the stirring container and the stirring rod in cooperation with each other in the noodle maker according to the first embodiment of the present application.

As shown in FIG. 3, the stirring container 2 is in a circular shape and has a diameter of D. Such an arrangement allows the stirring container to have a smooth inner wall, and no dead corner for dough kneading will be presented in the inner wall of the stirring container when a dough kneading process is performed, avoiding dough residue leaving in the stirring container.

As shown in FIGS. 1 to 5, the stirring rod 3 is longitudinally arranged in the stirring container 2. In this embodiment, the stirring rod 3 includes a rod body 31, and an upper stirring blade 32 and a lower stirring blade 33 arranged on the rod body 31. The number of the upper stirring blade 32 and the number of the lower stirring blade 33 are both one, and the upper stirring blade 32 and the lower stirring blade 33 are distributed symmetrically with respect to the rod body 31, and edges of the upper stirring blade 32 and the lower stirring blade 33 are in an arc shape. The advantages of such an arrangement lie in that a smooth operation of the stirring rod is ensured, and the noise during operation of the stirring rod is lowered, and the moving path of the flour along with the stirring rod is lengthened due to the arc shape of the upper stirring blade and the lower stirring blade. That is, with equal stirring time, the duration of the flour being stirred is prolonged, which further improves the dough kneading effect. Moreover, one upper stirring blade and one lower stirring blade are provided, which not only facilitates the manufacture and machining of the stirring rod and allows the stirring rod to have a simple structure, but also allows the doughs to fall down and participate in the next mixing and stirring process, and further facilitates cleaning of the stirring rod.

Figure 4:
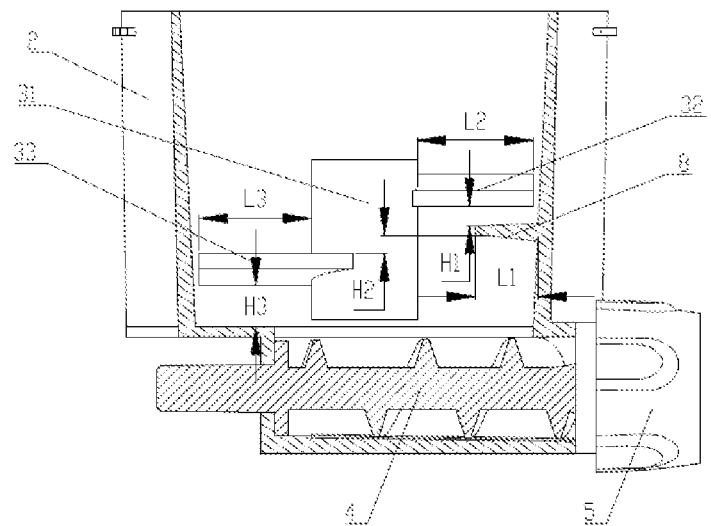
FIG. 4 is a sectional view showing the stirring container and the stirring rod in cooperation with each other in the noodle maker according to the first embodiment of the present application.
Figure 5:
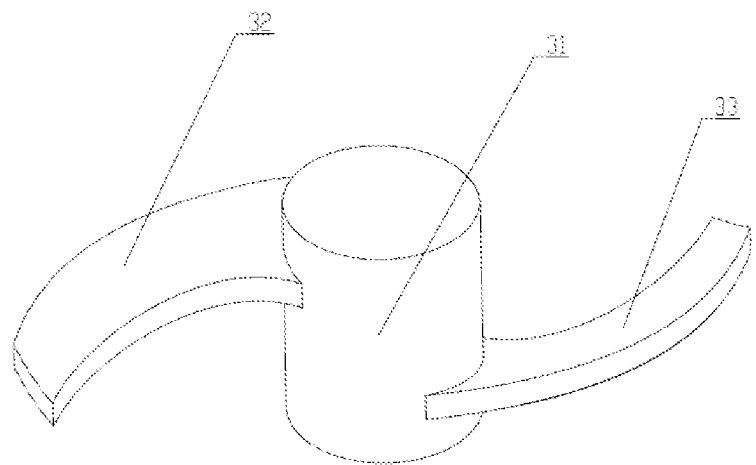
FIG. 5 is a schematic view showing the structure of the stirring rod in the noodle maker according to the first embodiment of the present application.

As shown in FIG. 4, the spiral rod 4 is horizontally arranged in the extrusion cylinder 6, and a pushing spiral 41 and an extruding spiral 42 are arranged on a surface of the spiral rod 4. The pushing spiral 41 has a pitch greater than a pitch of the extruding spiral 42. The extrusion cylinder 6 is horizontally arranged at one side below the stirring container 2. The spiral rod 4 is arranged in the extrusion cylinder 6. The motor allows the stirring rod 3 and the spiral rod 4 to rotate, and a feeding inlet 7 is arranged at a place where the extrusion cylinder 6 and the stirring container 2 are communicated. The feeding inlet 7 is arranged at the bottom of the stirring container 2, and the feeding inlet 7 includes a longitudinal edge close to the center of the stirring container 2, and the longitudinal edge is formed by crossing of the extrusion cylinder 6 and the bottom of the stirring container 2. The longitudinal edge extends along the bottom to a side wall of the stirring container 2, and extends to a joint between the side wall and the bottom of the stirring container 2. The extrusion cylinder 6 is integrally formed with the stirring container 2 by injection molding.

As shown in FIG. 1, the motor includes a first output shaft and a second output shaft. The first output shaft is in transmission connection with the stirring rod 3, and the second output shaft is in transmission connection with the spiral rod 4. The first output shaft is in transmission connection with the second output shaft by a transmission structure. The transmission structure may be a gear transmission structure, a belt transmission structure, or a chain transmission structure. Thus, multi-shaft transmission may be performed by only one motor, which reduces the cost of the whole machine.

A rotation center line of the stirring rod 3 and a rotation center line of the spiral rod 4 are arranged on different planes and perpendicular to each other, thus, it is easier for the doughs to enter the feeding inlet, avoiding dough residue. Furthermore, the extrusion cylinder and the stirring container are formed integrally, which facilitates the manufacturing of the stirring up, and reduces errors in the manufacturing and assembling process, and the structure is simple, and the strength is reliable.

As shown in FIG. 4, an inner wall of the stirring container 2 is provided with a cutting rod 8 located between the upper stirring blade 32 and the lower stirring blade 33. The stirring rod 3 is driven by the motor to rotate and allows the upper stirring blade 32 and the lower stirring blade 33 to rotate and mix the flour and water into doughs. The cutting rod 8 cooperates with the upper stirring blade 32 and the lower stirring blade 33 to cut the doughs into doughs smaller than the feeding inlet in size. The advantages of such an arrangement lie in that, when the dough kneading process is performed, the upper stirring blade and the lower stirring blade mix flour with water and brings the mixture close to the cutting rod, and the cutting rod cooperates with the upper stirring blade and the lower stirring blade to cut the doughs into doughs smaller than the feeding inlet in size, and then the upper stirring blade and the lower stirring blade further mix the doughs smaller than the feeding inlet in size and other doughs together to form doughs, and then the mixed doughs are cut or torn to be deformed by the upper stirring blade, the lower stirring blade and the cutting rod into doughs smaller than the feeding inlet in size. The above process is repeated, to mix the flour and water sufficiently and uniformly to reach a required mixed state. Moreover, the dough kneading is speeded up, and the dough kneading efficiency is improved, and the noodles made are more chewy. In an extruding and shaping process, by providing the cutting rod on the inner wall of the stirring container, the mixed doughs are cut or torn to be deformed by the upper stirring blade, the lower stirring blade and the cutting rod into doughs smaller than the feeding inlet in size, and then the doughs smaller than the feeding inlet in size are pushed by the stirring rod into the extrusion cylinder from the feeding inlet, thus facilitating the doughs entering the extrusion cylinder via the feeding inlet, and ensuring that no dough residue is left in the stirring container.

As shown in FIGS. 3 and 4, the cutting rod 8 is in a long strip shape, and is platy, and the cutting rod 8 has a trapezoid vertical section. The cutting rod 8 protrudes inwardly into the stirring container 2 in a horizontal direction, and the cutting rod 8 and the stirring container 2 are integrally formed by injection molding. The cutting rod 8 has a length of L1. Such an arrangement may facilitate the upper stirring blade, the lower stirring blade and the cutting rod forming the cutting effect, which further improves the dough kneading effect, and since the cutting rod 8 and the stirring container 2 are integrally formed by injection molding, the structure is simple, and is easy to be produced and manufactured. Secondly, the cutting rod extends into the stirring container in a horizontal direction, which, in one aspect, ensures that the stirring and mixing process can be performed during the dough kneading process, and in another aspect, ensures that the stirring rod and the cutting rod can cooperate to cut doughs during the dough cutting stage, so as to sufficiently mix the doughs and allow the noodle made to be more chewy, and moreover, ensures that the doughs can be cut into sufficiently small doughs to continuously enter the feeding inlet, and be sufficiently extruded and shaped without any dough residue. Furthermore, the cutting rod and the stirring container are integrally formed, thus the secondary forming process is reduced, and the process efficiency is high, and the cutting rod has a high strength, and is not apt to be broken.

The upper stirring blade 32 has a length of L2, and $D/10 \leq L1 < L2 < D/2$, the lower stirring blade 33 has a length of L3, and $D/10 \leq L1 < L2 < D/2$, where L2=L3. The advantages of such an arrangement lie in that the upper stirring blade and the lower stirring blade have the same length, such that the distance of the upper stirring blade from the cutting rod is equal to the distance of the lower stirring blade from the cutting rod, and the cutting forces in two cutting operations are equal to each other in magnitude, thereby ensuring that the stirring rod can operate smoothly. Moreover, D/10≤L1<L2(L3)<D/2, in this way, the upper stirring blade and the lower stirring blade can overlap with the cutting rod effectively to generate large cutting forces, which ensures that, a large amount of flour can be driven to move and the flour is allowed to roll violently when the stirring rod rotates, thus the mixing is sufficient and uniform, and the dough kneading effect is improved, and further ensures sufficient cutting forces and allows the doughs to easily enter the feeding inlet. Secondly, L2 or L3 being greater than L1 also allows the cutting rod to effectively overlap with the upper stirring blade and the lower stirring blade, which ensures sufficient cutting forces, and further ensures the strength of the cutting rod. In a case that L1 is smaller than D/10, the cutting rod cannot form effective cutting effect together with the upper stirring blade and the lower stirring blade, that is, the generated cutting forces are too small, causing a poor dough kneading effect, and further, the doughs entering the feeding inlet may be interfered. In a case that L2 or L3 is greater than D/2, the upper stirring blade and the lower stirring blade may interfere with the inner wall of the stirring container. In a case that L1 is less than L2, the cutting rod is too long and apt to be broken, and has a poor strength, however, the upper stirring blade and the lower stirring blade are too short, causing a poor dough kneading effect.

The cutting rod 8 is arranged above the feeding inlet 7, and is located at an upstream side of the feeding inlet 7. With such an arrangement, in the dough extruding stage, after the cutting rod interacts with the upper stirring blade as well as the lower stirring blade and cuts the materials, the materials fall into the feeding inlet directly, and further enter the extrusion cylinder, thus speeding up the dough feeding speed, and improving the dough extruding efficiency. While in the stirring stage, since the stirring rod rotates reversely, the cutting rod is located at a downstream side of the feeding inlet, after the cutting rod interacts with the upper stirring blade as well as the lower stirring blade and cuts the material, the materials will not directly fall into the feeding inlet, and may continue to be rotated along with the upper stirring blade and the lower stirring blade, which prevents part of the materials that have not been fully mixed, for example, dry flour, from entering the extrusion cylinder during the stirring stage, and prevents the noodles extruded out initially from carrying dry flour, having lots of burrs, being not chewy, and having poor mouth feel.

As shown in FIGS. 3 and 4, the center line of the cutting rod 8 and the rotation center line of the stirring rod 3 are on different planes and perpendicular to each other, thus facilitating the integrally forming of the cutting rod with the stirring container. In the case that the center line of the cutting rod intersects with the rotation center line of the stirring rod, the moulds may interfere with each other, which does not facilitate the molding of the cutting rod when the cutting rod is molded.

As shown in FIG. 3, when the upper stirring blade 32 and the lower stirring blade 33 are rotated to a position of the cutting rod 8, the projection of the cutting rod 8 in a horizontal direction at least partially overlaps with the projections of the upper stirring blade 32 and the lower stirring blade 33 in the horizontal direction, and the length of which the cutting rod 8 overlaps with the upper stirring blade and/or the lower stirring blade is L, and D/5≤L<D/2. The advantages of such an arrangement lie in that at the dough kneading stage, the overlapping planes of the cutting rod and the upper stirring blade and the overlapping planes of the cutting rod and the lower stirring blade respectively define a cutting region therebetween, thus ensuring the effect and efficiency of cutting the doughs. By the cutting and the repeated kneading after the cutting, the manual repeated dough kneading effect is achieved, such that the noodles made of the dough is more chewy. In the dough extruding stage, the cutting force generated between the cutting rod and the stirring rod is greater, such that the doughs can be cut smaller, and can more easily enter into the feeding inlet, and the dough feeding can be more easily, and no dough residue will be left. Further, D/5≤L<D/2, the cutting rod is allowed to have a certain overlapping length with the upper stirring blade and/or the lower stirring blade, which ensures that the cutting rod and the upper stirring blade as well as the cutting rod and the lower stirring blade can perform cut better, and effectively ensures that the flour and the water can be mixed more sufficiently and uniformly. Moreover, the doughs are more easily cut off or torn to be deformed, and the dough feeding is facilitated. In the case that L is shorter than D/5, the cutting rod cannot perform effective cutting together with the upper stirring blade and the lower stirring blade, that is, the generated cutting forces are too small, causing a poor dough kneading effect. In the case that L is longer than D/2, the cutting forces generated between the cutting rod and the upper stirring blade and between the cutting rod and the lower stirring blade are too large, causing an increased load and a reduced service life of the motor, and if the service life has to be improved, the performance of the motor also has to be improved, thus the cost is increased as a result.

As shown in FIG. 4, a height from an upper end surface of the cutting rod to a lower end surface of the upper stirring blade is H1, and a height from a lower end surface of the cutting rod to an upper end surface of the lower stirring blade is H2, where H1=H2. The distance from a lowermost end of the lower stirring blade 33 to the bottom of the stirring container 2 is H3. H3 ranges from 3 mm to 10 mm. In this embodiment, H3 is 5 mm, of course, H3 may optionally be 3 mm, 3.5 mm, 4 mm, 4.5 mm, 5.5 mm, 6 mm, 6.5 mm, 7 mm, 7.5 mm, 8 mm, 8.5 mm, 9 mm, 9.5 mm, 10 mm. The distance from the cutting rod 8 to the lowermost end of the upper stirring blade 32 is equal to the distance from the cutting rod 8 to the uppermost end of the lower stirring blade 33. The advantages of such an arrangement lie in that it ensures that even the flour or doughs or dough pieces at the bottom of the stirring container can be scraped off by the stirring rod without any dough residue, and avoid waste. In the case that H3 is less than 3 mm, due to un-smoothness of the rotation of the stirring rod, it is apt to cause friction between the lower stirring blade and the bottom of the stirring container, which thus may reduce normal service life of the stirring rod. In the case that H3 is greater than 10 mm, the distance between the lower stirring blade and the bottom of the stirring container is too large, causing that the flour or doughs or dough pieces at the bottom of the stirring container cannot be scraped off by the stirring rod, and flour or doughs or dough pieces leave at the bottom of the stirring container, causing waste. Further, the distance from the cutting rod to the upper stirring blade is equal to the distance from the cutting rod to the lower stirring blade, allowing the cutting force between the cutting rod and the upper stirring blade to be equal to the cutting force between the cutting rod and the lower stirring blade, thus ensuring the smoothness of the operation of the stirring rod.

Figure 6:
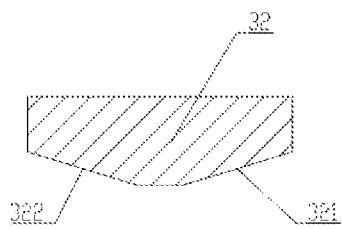
FIG. 6 is a schematic view showing a longitudinal section of an upper stirring blade in the noodle maker according to the first embodiment of the present application.

As shown in FIG. 6, the vertical section of the upper stirring blade 32 has a rhombus shape or a parallelogram shape. The lower end surface of the upper stirring blade 32 is provided with a first oblique surface 321 and a second oblique surface 322. The first oblique surface 321 is configured to push and press the material at the stirring stage, and the second oblique surface 322 is configured to push and press the material at the dough extruding stage. The first oblique surface 321 and the second oblique surface 322 are transitionally connected. The advantages of such an arrangement lie in that, at the stirring stage, the first oblique surface pushes and presses the material downwards, which reduces the height of the material rolling upwards, that is, the time of the material falling off is reduced, and the stirring time is shortened, and the stirring efficiency is improved; and at the dough extruding stage, the second oblique surface pushes and presses the material downwards, which facilitates the material's entering the extrusion cylinder, and thereby the dough extruding efficiency is improved, the processing time is saved, and the processing efficiency is improved.

Figure 7:
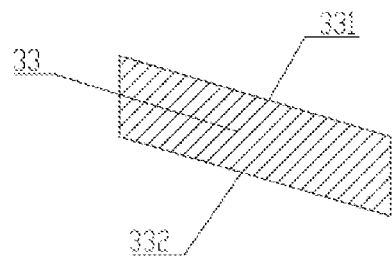
FIG. 7 is a schematic view showing a longitudinal section of a lower stirring blade in the noodle maker according to the first embodiment of the present application.

As shown in FIG. 7, the lower stirring blade 33 includes a stirring surface 331 and a pushing surface 332, and the stirring surface 331 and the pushing surface 332 are oblique surfaces. The stirring surface 331 refers to a main contact surface of the lower stirring blade 33 in contact with the flour when the lower stirring blade 33 stirs the flour. The pushing surface 332 refers to a main contact surface of the lower stirring blade 33 in contact with the flour when the lower stirring blade 33 pushes the flour. The advantages of such an arrangement lie in that the lower stirring blade is enabled to generate a downward pressing force to the material at both the stirring stage and the dough extruding stage, thus the efficiencies of the stirring stage and the dough extruding stage is improved.

A noodle making method of the vertical noodle maker according to the present application has the following specific workflows.

(1) A customer adds flour and water in the stirring container of the noodle maker, and presses a common noodle key, and the noodle maker starts to work.

(2) Dough kneading step: the first output shaft allows the stirring rod 3 to rotate forwardly, and the second output shaft drives the spiral rod 4 to rotate forwardly, and the upper stirring blade and the lower stirring blade (32, 33) on the stirring rod 3 stir the flour and water, and when a mixture of the flour and water is brought by the upper mixing blade and the lower mixing blade (32, 33) to a position close to the cutting rod 8, and is subjected to the action of the cutting rod 8, the mixture moves reversely to return to a position close to the upper stirring blade and the lower stirring blade (32, 33) to be further stirred and mixed. When the flour and water are stirred by the upper stirring blade and the lower stirring blade (32, 33) into doughs, the upper stirring blade and the lower stirring blade (32, 33) push the doughs to move to a position close to the cutting rod 8, and the cutting rod 8 cooperates with the upper stirring blade and the lower stirring blade (32 and 33) to cut the doughs or tear the doughs to be deformed into doughs smaller than the feeding inlet in size, and then the upper stirring blade and the lower stirring blade (32, 33) mix the doughs smaller than the feeding inlet in size and other doughs together and the mixer is then cut or torn to be deformed by the upper stirring blade, the lower stirring blade (32, 33) and the cutting rod 8 into doughs smaller than the feeding inlet in size.

In the above dough kneading step, the specific working process of the motor is described as follows: the first output shaft and the second output shaft keep rotating forwardly by a time period t1, and the dough kneading process finishes.

(3) Extruding and shaping step: the stirring rod 3 and the spiral rod 4 rotate reversely and simultaneously, and the doughs smaller than the feeding inlet in size are pushed by the upper stirring blade and the lower stirring blade (32, 33) to the feeding inlet 7, and fall into the pushing spiral 41 in the feeding inlet 7, and then are brought into the extrusion cylinder by the pushing spiral 41. Doughs greater than the feeding inlet in size are pushed by the upper stirring blade and the lower stirring blade (32, 33) to a position close to the cutting rod 8, and the cutting rod 8 cooperates with the upper stirring blade and the lower stirring blade (32, 33) to cut the doughs greater than the feeding inlet in size or tear them to be deformed into doughs smaller than the feeding inlet, thus the dough smaller than the feeding inlet in size are continued to be pushed into the feeding inlet 7, and fall into the pushing spiral 41 in the feeding inlet 7, and are brought into the extrusion cylinder 6 by the pushing spiral 41, and further, the doughs entered the extrusion cylinder 6 are extruded and shaped through the extrusion die 5 under the driving of the reverse rotation of the spiral rod 4.

In the above extruding and shaping step, the specific working process of the motor is described as follows: the first output shaft and the second output shaft keep rotating reversely by a time period t2, and the dough extruding finishes.

In the above noodle making method, the dough kneading step is added the following step: the upper stirring blade and the lower stirring blade mix and stir the flour and water, and when a mixture of the flour and water is brought by the upper mixing blade and the lower mixing blade to a position close to the cutting rod, and is subjected to the action of the cutting rod, the mixture moves reversely to continue to return a position close to the upper stirring blade and the lower stirring blade to be further stirred, cut and mixed, till the doughs are stirred to be smaller than the feeding inlet in size. In this way, the doughs are stirred more sufficiently and the dough extruding effect is better, and thereby the extruded noodles are more chewy. Secondly, it is added to the dough kneading step the following step: the upper stirring blade and the lower stirring blade push the doughs to move to a position close to the cutting rod, and the cutting rod cooperates with the upper stirring blade and the lower stirring blade to cut part of the doughs or tear them to be deformed, then the upper stirring blade and the lower stirring blade stir and mix the cut or torn and deformed doughs together with other doughs to form new doughs, and the newly formed doughs are then cut or torn to be deformed by the upper stirring blade and the lower stirring blade and the cutting rod. In this way, are the doughs kneaded more sufficiently, and are the noodles made more chewy, but also are the doughs, after being cut or torn, become same or narrowed, and are more easily enter from the feeding inlet, such that the dough feeding is easier, and no any dough residue is left, and the processing efficiency is improved. Further, in the dough kneading step, the spiral rod also rotates forwardly to push the flour or doughs entered the extrusion cylinder back to the stirring container, and the flour or the doughs in the stirring container are stirred and mixed, thus the dough kneading effect is further improved, and moreover, the issues that the noodles initially extruded carry dry flour and are burred and not chewy with poor mouth feel are avoided, and the issues of motor locking or burning are avoided.

It may be appreciated that, the stirring container is provided with a positioning hole, and the cutting rod is fixed to the positioning hole by secondary forming; or the stirring container is provided with a positioning hole, and the cutting rod is inserted into the positioning hole and is fixed to the stirring container.

It may be appreciated that, the stirring container is in a square shape or a polygonal shape, and edges of the square or polygonal stirring container are smoothly connected by circular arcs.

It may be appreciated that, the vertical section of the cutting rod is in a triangular shape or a square shape or an elliptical shape.

It may be appreciated that, the cutting rod is fixed into the stirring container by secondary injection molding or snap-fit or insert connection.

It may be appreciated that, edges of the upper stirring blade and the lower stirring blade are in bent shapes.

It may be appreciated that the extrusion cylinder is connected to the stirring container by secondary injection molding or snap-fit or insert connection or threaded connection.

It may be appreciated that, the stirring blade may be one, and may be in a "Z" shape or "L" shape; or, the stirring blade may be two, and the two stirring blades are arranged symmetrically in a same plane; or the stirring blades may be plural, and may just be symmetrically distributed in the direction of rotation axis, and cooperate with the cutting rod to complete cutting.

It may be appreciated that, multiple cutting rods may also be provided, and the multiple cutting rods may be arranged in different positions on the inner wall of the stirring container, and may be distributed in a same plane and may also be distributed in planes with different levels, for example, two cutting rods may be provided and respectively arranged at an upstream side and a downstream side of the feeding inlet; or may be symmetrically arranged on inner wall of the stirring container.

It may be appreciated that, the noodle maker may be used as a dough kneading machine solely, that is, simply achieves the dough kneading function. The dough kneading process is as follows.

A customer adds flour and water in the stirring container of the noodle maker and presses a dough kneading key, and the noodle maker starts to work: the first output shaft drives the stirring rod 3 to rotate forwardly, and the second output shaft drives the spiral rod 4 to rotate forwardly, and the upper stirring blade and the lower stirring blade (32, 33) on the stirring rod 3 stir the flour and water, and when a mixture of the flour and water is brought by the upper mixing blade and the lower mixing blade (32, 33) to a position close to the cutting rod 8 and is subjected to the action of the cutting rod 8, the mixture moves reversely to continue to return a position close to the upper stirring blade and the lower stirring blade (32, 33) to be further stirred and mixed. When the flour and water are stirred by the upper stirring blade and the lower stirring blade (32, 33) into doughs, the upper stirring blade and the lower stirring blade (32, 33) push the doughs to move to a position close to the cutting rod 8, and the cutting rod 8 cooperates with the upper stirring blade and the lower stirring blade (32 and 33) to cut the doughs or tear the doughs to be deformed into doughs smaller than the feeding inlet in size, and then the upper stirring blade and the lower stirring blade (32, 33) mix the doughs smaller than the feeding inlet in size and other doughs together and the mixture is then cut or torn to be deformed by the upper stirring blade, the lower stirring blade (32, 33) and the cutting rod 8 into doughs smaller than the feeding inlet in size.

In the dough kneading process, due to being subjected to the action of the cutting rod, the doughs are continuously cut or torn to be deformed in the dough kneading process, thus allowing the dough kneading effect to be better.

It may be appreciated that, the noodle maker may be used as an extrusion machine solely, that is, to achieve simply the dough extruding function, and the dough extruding process is as follows.

The customer places doughs into the stirring container and presses an extrusion key, and the noodle maker starts to work. The stirring rod 3 and the spiral rod 4 rotate reversely and simultaneously, and the doughs smaller than the feeding inlet in size are pushed by the upper stirring blade and the lower stirring blade (32, 33) to the feeding inlet 7, and fall into the pushing spiral 41 in the feeding inlet 7, and then are brought into the extrusion cylinder by the pushing spiral 41. Doughs greater than the feeding inlet in size are pushed by the upper stirring blade and the lower stirring blade (32, 33) to a position close to the cutting rod 8, and the cutting rod 8 cooperates with the upper stirring blade and the lower stirring blade (32, 33) to cut the doughs greater than the feeding inlet in size or tear them to be deformed into doughs smaller than the feeding inlet, thus the dough smaller than the feeding inlet in size are continued to be pushed into the feeding inlet 7, and fall into the pushing spiral 41 in the feeding inlet 7, and are brought into the extrusion cylinder 6 by the pushing spiral 41, and further, the doughs entered the extrusion cylinder 6 are extruded and shaped through the extrusion die 5 under the driving of the reverse rotation of the spiral rod 4.

In the dough extruding process, under the action of the cutting rod, the doughs are further torn and kneaded by the cutting rod and the stirring blades cooperated with each other, and are mixed and torn again, to be kneaded more sufficiently, which allows the noodles produced to be more chewy.

Figure 8:
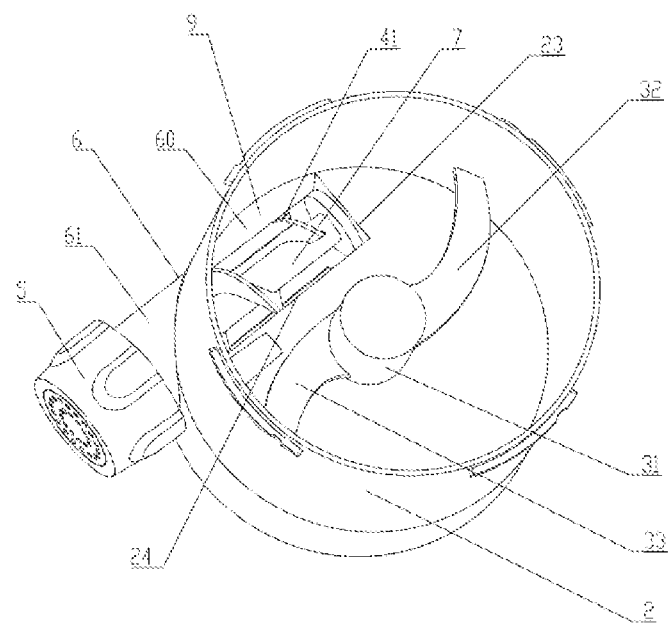
FIG. 8 is a schematic view showing the structure of a feeding inlet of a noodle maker according to a second embodiment of the present application.
Figure 9:
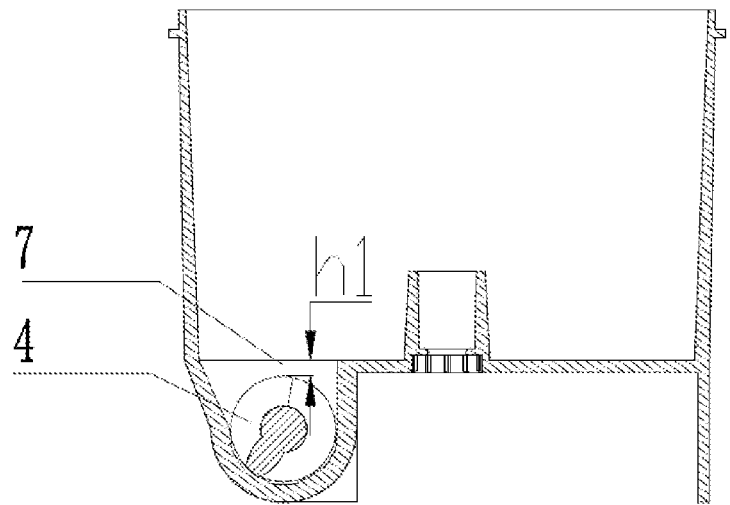
FIG. 9 is a schematic view showing the structure of a spiral rod of the noodle maker according to the second embodiment of the present application.

A second embodiment is described hereinafter. As shown in FIGS. 8 and 9, the extrusion cylinder 6 includes a material pushing chamber 60 and an extrusion chamber 61, and the material pushing chamber 60 and the extrusion chamber 61 are in communication with each other. Rotation directions of the spiral rod are opposite at the stirring stage and the dough extruding stage, and a feeding inlet 7 is provided at the bottom of the stirring container 2 at a place away from the center of the stirring container 2, and the feeding inlet 7 is in communication with the extrusion cylinder 6. The material pushing chamber 60 extends upwards and intersects with the bottom of the stirring container 2 to form the feeding inlet 7. The feeding inlet 7 extends horizontally along the bottom of the stirring container towards the extrusion cylinder, and extends to the side wall of the stirring container 2. The stirring container and the extrusion chamber form an integrated cavity, and the pushing spiral 41 of the spiral rod 4 is arranged in the pushing chamber 60 below the feeding inlet 7. The advantages of such an arrangement lie in that by arranging the feeding inlet in the bottom of the stirring container at the place away from the center of the stirring container, the stirred dough is moved towards the periphery of the stirring container under the action of the centrifugal force, and falls directly into the feeding inlet due to gravity, thus the dough feeding process is facilitated, and the sufficient dough feeding is ensured, and the doughs are not apt to be left in the stirring container. By extending the feeding inlet to the side wall of the stirring container, the feeding inlet is ensured to be maximized, which allows more doughs to be fed per unit time, thus the efficiency of the dough feeding is improved. Since the pushing spiral is arranged below the feeding inlet in the dough feeding process, the doughs can directly fall into the pushing spiral, and under the action of the pushing spiral, the doughs entered the pushing spiral can be ensured to be directly brought into the extrusion chamber, thus the smoothness of the dough feeding is ensured. Rotation directions of the spiral rod are opposite at the stirring stage and the dough extruding stage, thus allowing the pushing spiral to participate in the stirring process of the flour, and allowing the flour to be brought out by the pushing spiral and return to the stirring container for participating in the stirring process without being accumulated in the extrusion chamber, therefore locking of the motor due to accumulation of flour will be avoided. While at the dough extruding stage, the flour can normally participate in the extruding process of the doughs.

The feeding inlet 7 has an area of A2, and the area of the bottom of the stirring container 2 is A1, where ⅛A1≤A2<½A1, where A2/A1=S. The advantages of such an arrangement lie in that: in the case that A2≤⅛A1, the area of the feeding inlet is too small, and the dough feeding efficiency is low, which may adversely affect the shaping of the noodles; and in the case that A2≥½A1, the area of the dough feeding area is too large, and the doughs entered the material pushing chamber per unit time will be increased, and the dough extruding load may be increased accordingly, i.e., the requirement imposed on the output power becomes high, and the requirement imposed on the motor also increases accordingly, causing an increased cost.

A place, where the feeding inlet is connected to the side wall of the stirring container, is provided with an oblique surface 9, and the oblique surface 9 inclines towards an inside of the extrusion cylinder and extends downwards into the material pushing chamber. The oblique surface 9 and the extrusion cylinder are formed integrally. In this embodiment, since the stirring container has a circular shaped cross section, and has a circular arc shaped side wall, an initial end of the oblique surface 9 also has a circular arc shape. The advantages of such an arrangement lie in that by providing the oblique surface, the stirred doughs, after entering the feeding inlet, directly enter the pushing spiral in the material pushing chamber under the downward sliding effect of the oblique surface to participate in the pushing and extruding process, and under the action of gravity, the dough is guided towards the extrusion cylinder to enter the extrusion cylinder more smoothly, which not only improves the efficiency in shaping the noodles, but also avoids dead corner being formed in the material pushing chamber, thus the dough residual rate is low, which avoids waste caused by the dough residue, and also facilitates the cleaning.

The uppermost end of the spiral of the spiral rod 4 is lower than the bottom of the stirring container, and in the case that it is lower than the bottom of the stirring container, the height difference of the uppermost end of the spiral rod from the bottom of the stirring container is h1, where h1≤10 mm. In this embodiment, h1 is 5 mm. In the case that h1>10 mm, a large gap is presented between the spiral rod and the bottom of the stirring container, thus in the process of stirring, the flour in the gap cannot completely participate in the stirring process, thus the stirring process is not sufficient. However, in the case that h1≤10 mm, in the process of stirring, the spiral rod rotates and brings the flour into the stirring container for participating in the stirring process, thus the stirring process can be performed more thoroughly and more sufficiently.

A third embodiment is described hereinafter. Unlike the first embodiment, in this embodiment, two motors are provided, i.e., a first motor and a second motor, and the first motor is in transmission connection with the stirring rod, and the second motor is in transmission connection with the spiral rod.

The motor (not illustrated) includes a first motor (not illustrated) and a second motor (not illustrated), the first motor is in transmission connection with the stirring rod 3, and the second motor is in transmission connection with the spiral rod 4, the first motor and the second motor are configured to drive the stirring rod 3 and the spiral rod 4 to rotate separately, and the first motor and the second motor are controlled separately by the control unit.

The advantages of this embodiment lie in that, with the two motors, the spiral rod and the stirring rod are controlled by separate motors, which facilitates the control and allows the control to be more accurate and reliable.

A fourth embodiment is described below. Unlike the first embodiment, in this embodiment, the stirring rod has a different structure.

Figure 10:
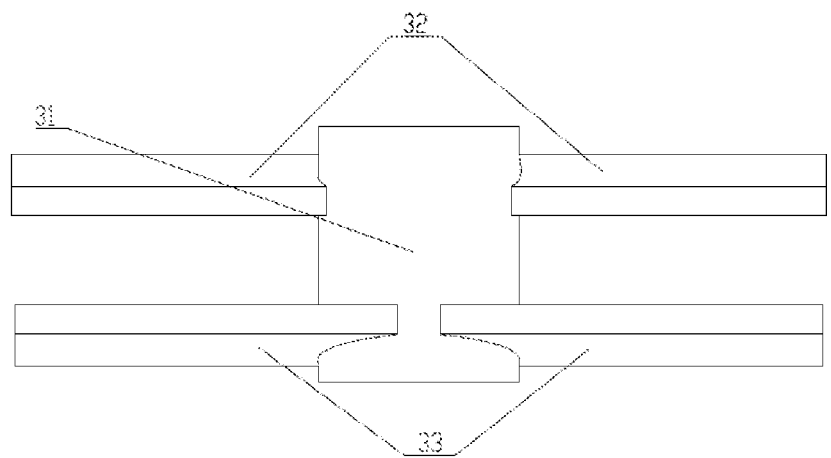
FIG. 10 is a schematic view showing the structure of a stirring rod in a noodle maker according to a fourth embodiment of the present application.

As shown in FIG. 10, two upper stirring blades 32 are provided and are located on the same horizontal plane, and the two upper stirring blades 32 are symmetrically distributed with respect to the rod body 31. Two lower stirring blades 33 are provided and are located on the same horizontal plane, and the two lower stirring blades 33 are symmetrically arranged with respect to the rod body 31. The two upper stirring blades 32 and the two lower stirring blades 33 are integrally formed with the rod body 31. Certainly, they may also be fixed together by secondary injection molding, or snap-fit or threaded connection or bonding.

The advantages of this embodiment lie in that, in one revolution of the stirring rod, the stirring rod may cooperate with the cutting rod to cut four times, thus the dough kneading effect is further improved, and the dough kneading efficiency is improved. Further, the doughs are cut to be smaller, and are easy to enter the extrusion cylinder, thus the dough feeding efficiency is improved, and the manufacturing efficiency is further improved, and it can also ensure that no dough residue will be left in the stirring container.

It may be appreciated that the noodle maker employs two motors.

It may be appreciated that one upper stirring blade is provided, and two lower stirring blades are provided; or two upper stirring blades are provided, and one lower stirring blade is provided.

A fifth embodiment is described below. In this embodiment, the stirring container is in a cylindrical shape, as shown in FIG. 8, an initial end of the extrusion cylinder is located in the bottom area of the stirring container, and intersects with the bottom of the stirring container to form a short straight edge 23 of the feeding inlet. The initial end of the pushing spiral is arranged close to the short straight edge 23. The advantages of such an arrangement lie in that, by configuring the stirring container into a cylindrical shape, the stirring rod keeps a consistent distance from the side wall of the stirring container in the stirring process, which allows the stirring effect to be more uniform, and avoids unstable situation caused by the pressure difference in the process of stirring. Further, the circular stirring container will not have cleaning dead corners, and is not apt to have doughs adhered thereon, thus the cleaning is more convenient. In addition, the cylindrical stirring container is also easy to be molded, and is convenient to be mounted. The initial end of the extruding cylinder is located in the bottom area of the stirring container, which facilitates the mounting of the spiral rod, and may ensure that the transmission shaft of the spiral rod is located below the stirring container, and facilitates the transmission connection of the transmission shaft of the spiral rod to the driving shaft of the motor in the base, thus the mounting and dismounting of the spiral rod can be more convenient, and the cleaning of the spiral rod can also be more convenient. In addition, the initial end of the pushing spiral is arranged close to the short straight edge, thus, in the process that the doughs participate in the stirring and pushing process performed by the pushing spiral, no closed space is presented at an upper end of the pushing spiral, and an upper part of the initial end of the pushing spiral is in direct communication with the feeding inlet, thus avoiding the defect that the flour does not participate in the stirring process at the initial end of the pushing spiral, and also preventing the dough from adhering on the initial end of the pushing spiral and an inner wall of the initial end of the extrusion cylinder, which allows the cleaning of the above two portions to be more convenient, and prevents cleaning dead corners from being formed.

As shown in FIG. 8, the side wall of the extrusion cylinder and the bottom of the stirring container intersect with each other to form a long straight edge 24 of the feeding inlet, and the long straight edge 24 and the short straight edge 23 perpendicularly intersect with each other. A place, where the feeding inlet is connected to the side wall of the stirring container, forms an arc edge of the feeding inlet, and the arc edge has one end connected to one end of the long straight edge 24, and has another end connected to an end of the short straight edge 23. The advantages of such an arrangement lie in that in the process of shaping and extruding of the noodles, the definition of the shape of the feeding inlet not only ensures the mounting and dismounting of the spiral rod, but also ensures the optimization of the area of the feeding inlet, which allows the doughs to easily enter the feeding inlet, and significantly improves the efficiency of making the noodles. Thus, in the dough extruding process, due to the rotation of the stirring rod, the stirred doughs move to a position close to the side wall of the stirring container by the centrifugal effect of the stirring rod, and under the combined action of the side wall, the stirring rod, and the gravity, the doughs can more easily fall into the pushing spiral in the feeding inlet, and smoothly and rapidly enter the material pushing chamber under the action of the pushing spiral, thus ensuring that the doughs can smoothly and continuously enter the extrusion chamber and can be extruded and shaped by the extrusion die, and preventing dough residue from being left in the mixing chamber. The large feeding inlet may facilitate the cleaning of the stirring chamber and the stirring rod, and moreover, arranging the feeding inlet in the bottom of the stirring chamber also allows the extrusion cylinder to have a simple structure and be easily manufactured.

Unlike the working process of the first embodiment, in the working process of this embodiment, a dough kneading step is further provided before the extruding and shaping step: the first output shaft allows the upper stirring blade and the lower stirring blade (32, 33) to keep rotating forwardly, and the second output shaft allows the spiral rod 4 to keep rotating forwardly, and the upper stirring blade and the lower stirring blade (32, 33) keep stirring the doughs forwardly, and also push the stirred doughs towards the cutting rod 8. The stirred doughs are then cut by the cutting rod 8, the upper stirring blade and the lower stirring blade (32, 33) cooperatively and are torn by them to be deformed. In this embodiment, the first output shaft and the second output shaft keep rotating by a time period t4, and the dough kneading process is finished. The advantages of adding the dough kneading process includes that, the doughs are kneaded better, and the noodles made can be more chewy and have a better mouth feel.

Other structures not described and beneficial effects of this embodiment are the same as those of the first embodiment, which are not described herein.

Certainly, it may be appreciated that, the working procedure of the noodle maker may also be added with a dough standing step, the dough standing step may be provided before the extruding and shaping step, and after the doughs standing process, the noodle maker employs the extrusion die for making steamed buns to extrude steamed buns, and the added dough standing step may facilitate the fermentation of the doughs before making the steamed buns. Therefore, the noodle maker can not only make noodle, but also make steamed buns, steamed twisted rolls and other wheaten foods after changing the extrusion die.

Preferred embodiments of the present application are described hereinbefore, and are not intended to limit the scope of implementation of the present application. All equivalent variations and modifications made based on the present application are covered by the scope of claims of the present application, and are not listed here in detail.

The invention claimed is:
1. A vertical household noodle maker, comprising:
a base having a motor,
a stirring container connected to the base,
a stirring rod,
an extrusion cylinder,
a spiral rod,
an extrusion die, and
a control unit,
wherein the stirring rod is longitudinally arranged in the stirring container, and the stirring rod comprises a rod body and a stirring blade arranged on the rod body, the extrusion cylinder is horizontally arranged at one side below the stirring container, the spiral rod is arranged in the extrusion cylinder, the motor is configured to drive the stirring rod and the spiral rod to rotate, and a feeding inlet is provided at a bottom of the stirring container, and the feeding inlet is in communication with the extrusion cylinder,
wherein an inner wall of the stirring container is provided with a cutting rod, and a projection of the cutting rod in a horizontal direction at least partially overlaps with a projection of the stirring blade in the horizontal direction in a case that the stirring blade is driven by the motor to rotate to a position of the cutting rod,
wherein the extrusion cylinder comprises a material pushing chamber and an extrusion chamber, and the material pushing chamber extends upward to intersect with the bottom of the stirring container to form the feeding inlet, and the feeding inlet extends horizontally towards the extrusion cylinder along the bottom of the stirring container, and extends to a side wall of the stirring container, a pushing spiral of the spiral rod is arranged in the material pushing chamber below the feeding inlet, and rotation directions of the spiral rod are opposite during a stirring stage and a kneading stage,
wherein a place where the feeding inlet is connected to the side wall of the stirring container, is provided with an oblique surface, and the oblique surface inclines towards an inside of the extrusion cylinder and extends downwards into the material pushing chamber.

* * * * *